United States Patent

Tao et al.

[11] Patent Number: 5,818,463
[45] Date of Patent: Oct. 6, 1998

[54] DATA COMPRESSION FOR ANIMATED THREE DIMENSIONAL OBJECTS

[75] Inventors: Hai Tao; Thomas S. Huang, both of Urbana, Ill.; Homer H. Chen; Tsae-Pyng Janice Shen, both of Thousand Oaks, Calif.

[73] Assignee: Rockwell Science Center, Inc., Thousand Oaks, Calif.

[21] Appl. No.: 799,818

[22] Filed: Feb. 13, 1997

[51] Int. Cl.[6] .................................................. G06T 13/00
[52] U.S. Cl. .......................................................... 345/473
[58] Field of Search ................................... 345/473, 474, 345/475, 419

[56] References Cited

U.S. PATENT DOCUMENTS

| | | | |
|---|---|---|---|
| 5,655,067 | 8/1997 | Takahashi et al. | 345/473 |
| 5,687,097 | 11/1997 | Mizusawa et al. | 345/474 |
| 5,692,212 | 11/1997 | Roach | 345/473 |
| 5,739,827 | 4/1998 | Nagano et al. | 345/473 |
| 5,754,190 | 5/1998 | Dutton et al. | 345/473 |

*Primary Examiner*—Cliff N. Vo
*Attorney, Agent, or Firm*—John J. Deinken

[57] ABSTRACT

Data which represents an animation sequence of a three dimensional object at a series of discrete time frames is compressed by identifying characteristic features of the object; generating a quadrangular mesh representation of the object, whereby the object is mathematically defined by dividing it into one or more regions and hierarchically representing each region by a mesh, each mesh including three coordinate matrices which define the positions of nodes within the mesh; selecting from the mesh representation of the features a set of animation parameters which are capable of specifying changes in the mesh corresponding to the animation of the object; compressing each region mesh by applying pyramid progressive coding to the coordinate matrices for the mesh; storing the initial values for the animation parameters at the beginning of the animation sequence; and, at each time frame after the beginning of the animation sequence, estimating the current values of the parameters and compressing each parameter by estimating the change in the value of the parameter by subtracting its stored value for the previous time frame from its current value, quantizing the estimated difference, applying entropy coding to the quantized difference and updating the stored value with the decoded value.

16 Claims, 3 Drawing Sheets

DATA COMPRESSION FOR ANIMATED THREE DIMENSIONAL OBJECTS

BACKGROUND OF THE INVENTION

This invention is concerned with techniques for compressing data which represents an animation sequence at a series of discrete time frames for a three dimensional (3D) object.

Emerging new technology, such as the World Wide Web, can provide interactivity with a 3D scene, either remotely or locally, and potentially offers a whole new horizon in animation within a 3D virtual environment. Ultimately, multiple users can share a virtual environment through a network, allowing the users to communicate and interact with the multimedia content of the environment. The multimedia content can include audio, video and 3D objects as well as human representation. There are enormous amounts of data involved in the animation of multimedia content in a 3D virtual environment. Since communication bandwidth over a network and space on local storage media are limited, a compressed representation of multimedia content and the virtual environment can significantly reduce the time required to transmit the data over communication channels, the time required to retrieve the data from storage, and the amount of space required to store the data. Moreover, communicating the compressed data through the communication channel between the transmission end and the receiving end can provide the possibility of real time interactive applications, for example real time streaming in animation control.

Over the Internet, a wide range of bandwidth and hardware capability will be encountered in communication channels and local platforms. Many applications may require the multimedia content to be available at different levels of details, resolution, or quality. Fine granularity of scalability in multimedia content is required to accommodate heterogeneous network connections and graceful degradation for time-critical decoding/rendering on different platforms. Requirements for scalability can be established by a set up procedure, which is supported by the international standard for coding of moving pictures and audio and will depend on bandwidths and decoder/encoder capabilities, at the negotiation phase. Interactivity in a virtual environment has to be provided for individual objects, rather than at the level of the conventional composited video frame. This requires coding to be performed on the pre-rendered, pre-composited multimedia data in order to offer the potential for higher compression performance and the opportunity for user interaction.

The ability to animate each 3D object is a very essential building block of the interactivity with multimedia content in a 3D environment. There are a few compression methods for mesh representation in the prior art (see, e.g., M. Deering, "Geometric Compression", ACM Computer Graphics Proceedings, Pages 13–20 (1995); G. Taubin and J. Rossignac, "Geometric Compression through Topological Surgery", IBM Research Report RC-20340 (1996)). The compression of animation parameters has not received much attention, in part because the amount of animation parameters is often smaller than the mesh data. For multiple users to communicate over networks, however, this type of data can increase significantly.

Mesh (wireframe) modeling is a well-known tool in two and three dimensional computer graphics and animation. FIG. 1 illustrates the general approach which is used in accomplishing wireframe modeling. A quadrangular mesh 100 refers to the tessellation of a 3D surface of an object into quadrangles. The vertices of the quadrangles are the nodes, such as the nodes 102, 104 and 106 of the mesh. Regular quadrangular meshes are considered for which the number of nodes in each row (column) is the same. That is, there are no missing nodes in each column and row. Because of the regularity of the nodes, the mesh topology need not be encoded, only the node positions. Furthermore, the node positions can be easily represented by three matrices, such as the sample matrices 110, 112 and 114, one for each coordinate component. Existing image coding tools can be easily applied since the three matrices can be considered as the Y, U, and V (or R, G, and B) components of a color image.

The mesh representation method described above can be extended to triangular mesh representation by relaxing the coplanar constraint on the four nodes of each quadrangle. Instead of one quadrangle, each group of four nodes then defines two triangles. Because the node configuration is the same, the compression method can be directly applied. However, additional information is needed in order to specify how each quadruple of nodes is divided into two triangles: either from the top-left node to the bottom-right node or from the top-right node to the bottom-left node. Such binary information for the mesh can be represented by a matrix and compressed by run length coding. It should be noted, however, that in some cases, one may not need to encode and transmit such a binary matrix. An example is the regular triangular mesh in which all quadruples of nodes are triangulated consistently. Obviously, in this case the decoder for such binary information can be omitted.

The mesh representation can be extended to meshes with irregular boundaries, i.e., meshes with an unequal number of nodes in the rows or columns of the meshes. This problem is analogous to the problem of coding an image segment of arbitrary shape by block DCT (discrete cosine transform). A solution is developed by first padding the irregular quadrangular mesh with artificial nodes (the exterior nodes) so that the resulting mesh becomes regular. The padding should be minimal; that is, there should not be any row or column consisting of all exterior nodes. Then the boundary information, by which the decoder will be able to tell the original nodes (the interior nodes) from the exterior nodes, is coded and transmitted to the decoder. Finally, the coordinate information of the mesh, represented by three matrices, is coded and transmitted to the decoder as well. Note that the exterior nodes are padded for the purpose of patching up the original mesh to form a quadrangular mesh. Their coordinates can be arbitrarily assigned. In practice, one can take advantage of this degree of freedom to maximize the performance of the coder. One approach finds the optimal solution by employing the theory of projection onto convex sets (Chen, et al., "Block Transform Coder for Arbitrarily Shaped Image Segment", U.S. Pat. No. 5,422,963).

SUMMARY OF THE INVENTION

It is an outstanding feature of the present invention to provide a compression method for bit-efficient animation of 3D objects. This is achieved by providing a coding method for the mesh and a coding method for a temporal sequence of animation parameters for communication and storage of a 3D scene involving animated 3D objects.

Data which represents an animation sequence of a three dimensional object at a series of discrete time frames is compressed by identifying characteristic features of the object; generating a quadrangular mesh representation of the object, whereby the object is mathematically defined by dividing it into one or more regions and hierarchically representing each region by a mesh, each mesh including three coordinate matrices which define the positions of nodes within the mesh; selecting from the mesh representation of the features a set of animation parameters which are capable of specifying changes in the mesh corresponding to the animation of the object; compressing each region mesh by applying pyramid progressive coding to the coordinate matrices for the mesh; storing the initial values for the animation parameters at the beginning of the animation sequence; and, at each time frame after the beginning of the animation sequence, estimating the current values of the parameters and compressing each parameter by estimating the change in the value of the parameter by subtracting its stored value for the previous time frame from its current value, quantizing the estimated difference, applying entropy coding to the quantized difference and updating the stored value with the decoded value.

DESCRIPTION OF THE INVENTION

The present invention provides a technique for the compression of data which represents an animation sequence of a three dimensional (3D) object at a series of discrete time frames.

Figure 2:
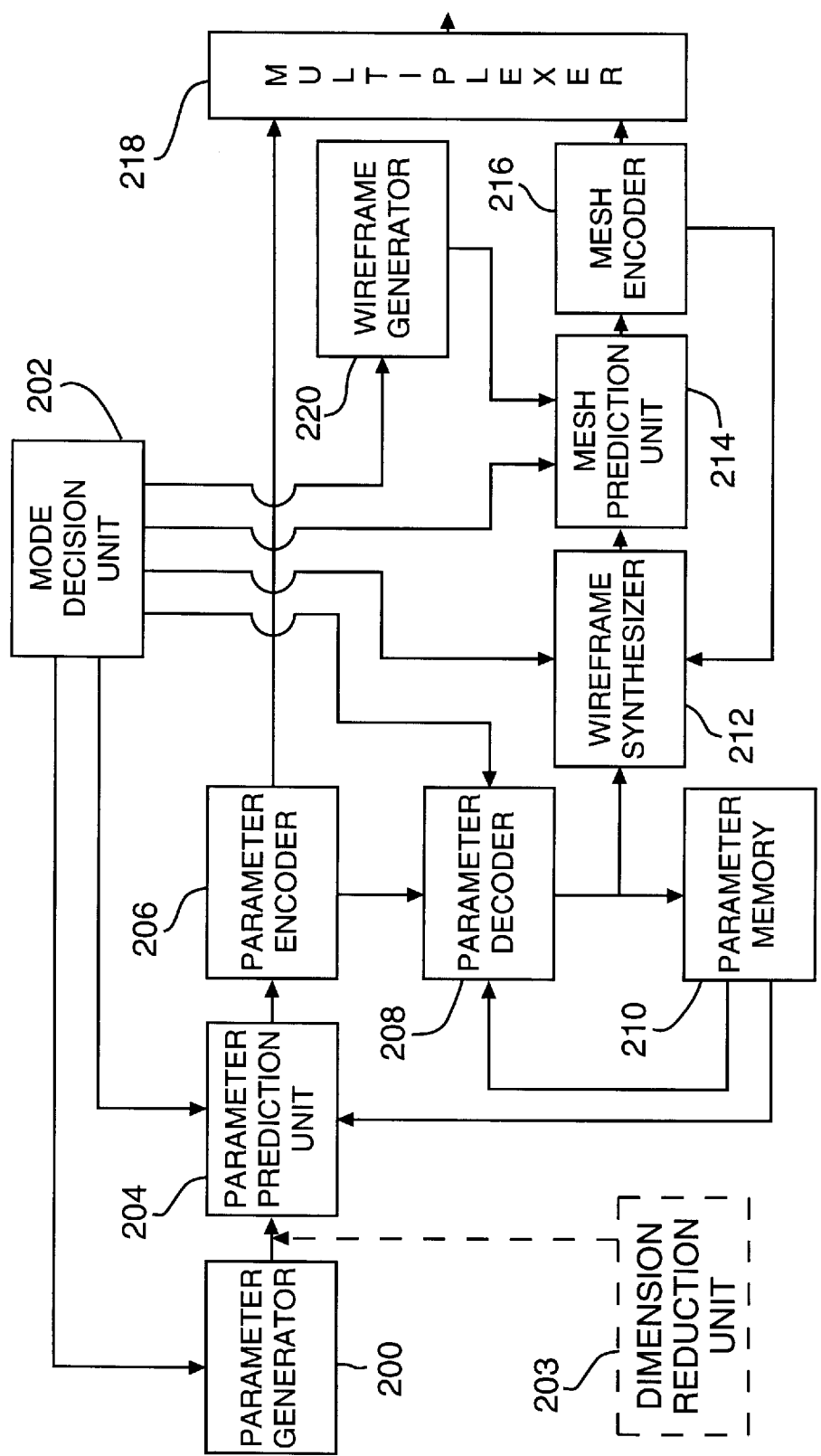
FIG. 2 is an encoding block diagram depicting the method of the present invention.

A block diagram which depicts the encoding technique of the invention is shown in FIG. 2. To perform the method of the invention, characteristic features of the object are first identified. A quadrangular mesh representation of the object shape is then generated. The mesh representation mathematically defines the object by dividing it into one or more regions and hierarchically representing each region by a mesh. Each mesh includes three coordinate matrices which define the positions of nodes within that mesh. A set of animation parameters which are capable of specifying changes in the mesh corresponding to the animation of the object are then selected. The values of these parameters at each time frame are specified by a parameter generator 200. The generation of the parameters in the parameter generator 200 can be based on a prewritten script, user interaction, image analysis of a conventional video sequence, a text-to-speech (TTS) system, or a facial action coding system (FACS).

The coding system includes a mode decision unit 202 for deciding which of three mode animation parameters are coded and transmitted to the decoder. The three modes of coding are "intra", "inter", and "disable". The mode decision unit 202 also decides in which of the three modes the mesh data are to be coded and transmitted. The mode decisions for animation parameters and mesh data are independent of each other. Therefore, the coding modes of the animation parameters and the meshes need not be the same. These three modes are discussed in greater detail below.

A parameter prediction unit 204 computes the difference between the current animation parameter received from the parameter generator 200 and a predicted value of the parameter which is retrieved from a parameter memory 210. The prediction unit 204 passes the difference signal to the parameter encoder 206, if the inter mode is selected for the animation parameter. If the intra mode is selected, no differencing is computed and the prediction unit directly passes the current animation parameter received from the parameter generator 200 to the parameter encoder 206. If the disable mode is selected for the animation parameter, the current animation parameter is not transmitted. No coding is performed in this case.

The parameter encoder 206 1) quantizes the signal received from the parameter prediction unit 204, 2) sends the quantized parameter to the parameter decoder 208, 3) performs entropy coding of the quantized parameter and 4) sends the entropy coded parameter to the multiplexer 218.

If the inter parameter coding mode is selected, the parameter decoder 208 1) performs an inverse quantization of the signal received from the parameter encoder 206, 2) adds the resulting signal to the stored signal fetched from the parameter memory 210, and 3) stores the summed signal in the parameter memory 210 and the wireframe synthesizer 212. If the intra coding mode is selected, the parameter decoder 208 inversely quantizes the parameter and directly outputs the result to the parameter memory 210 and the wireframe synthesizer 212. In the intra mode case, no addition is performed at the parameter decoder 208. If the disable mode is selected for parameter coding, no operation is performed at the parameter decoder 208.

The animation parameters only control the movement of a selected set of mesh nodes. Depending on the application tasks, it may be required to transmit the mesh data for the purpose of downloading or refining the object model in conjunction with the transmission of animation parameters. In this case, the parameter coding mode is enabled and object model refinement can be executed only if both the encoder and the decoder share a common object model. In another case, the parameter coding may be disabled, so that the animation of a 3D object relies totally on the mesh data. The wireframe synthesizer 212 performs differently for these two cases. The details are described in the following.

In the case where parameter coding is enabled (that is, in either intra or inter parameter coding mode), the wireframe synthesizer 212 takes the output of the parameter decoder 208 and synthesizes a mesh representation of the object using the object model commonly shared by both the encoder and the decoder. On the other hand, if the parameter coding is disabled, the wireframe synthesizer 212 takes the output of the local memory in a mesh encoder 216, decodes it, and generates a reconstructed mesh of the object.

The wireframe generator 220: 1) generates a wireframe representation of the object at the current frame based on, for example, the video data of the object, 2) transforms the mesh data to a more workable coordinate system (for example, a cylindrical coordinate system) and 3) outputs the resulting wireframe data to the mesh prediction unit 214. The goal of the coordination transform is to have a smoother representation of the mesh data than the original one in order to code the data more efficiently.

The mesh prediction unit 214 computes the difference between the output of the wireframe synthesizer 212 and the output of the wireframe generator 220 and sends the difference signal to the mesh encoder 216 if the inter mesh coding mode is selected. If the intra mesh coding mode is selected, the mesh prediction unit 214 directly passes the output of the wireframe generator 220 to the mesh encoder 216.

Figure 1:
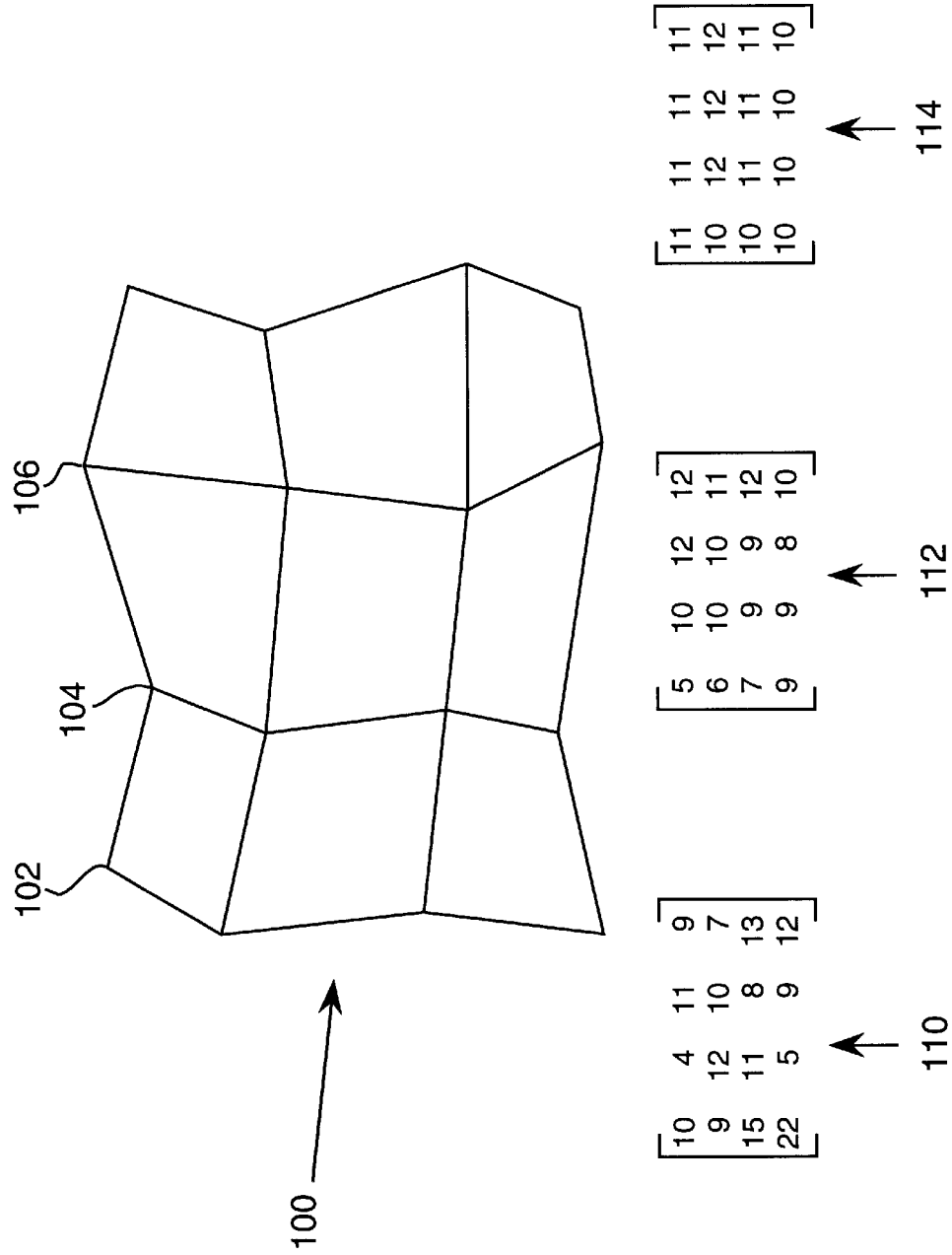
FIG. 1 (prior art) illustrates the mesh representation technique by depicting the mesh of a given region and its corresponding matrices.
Figure 3:
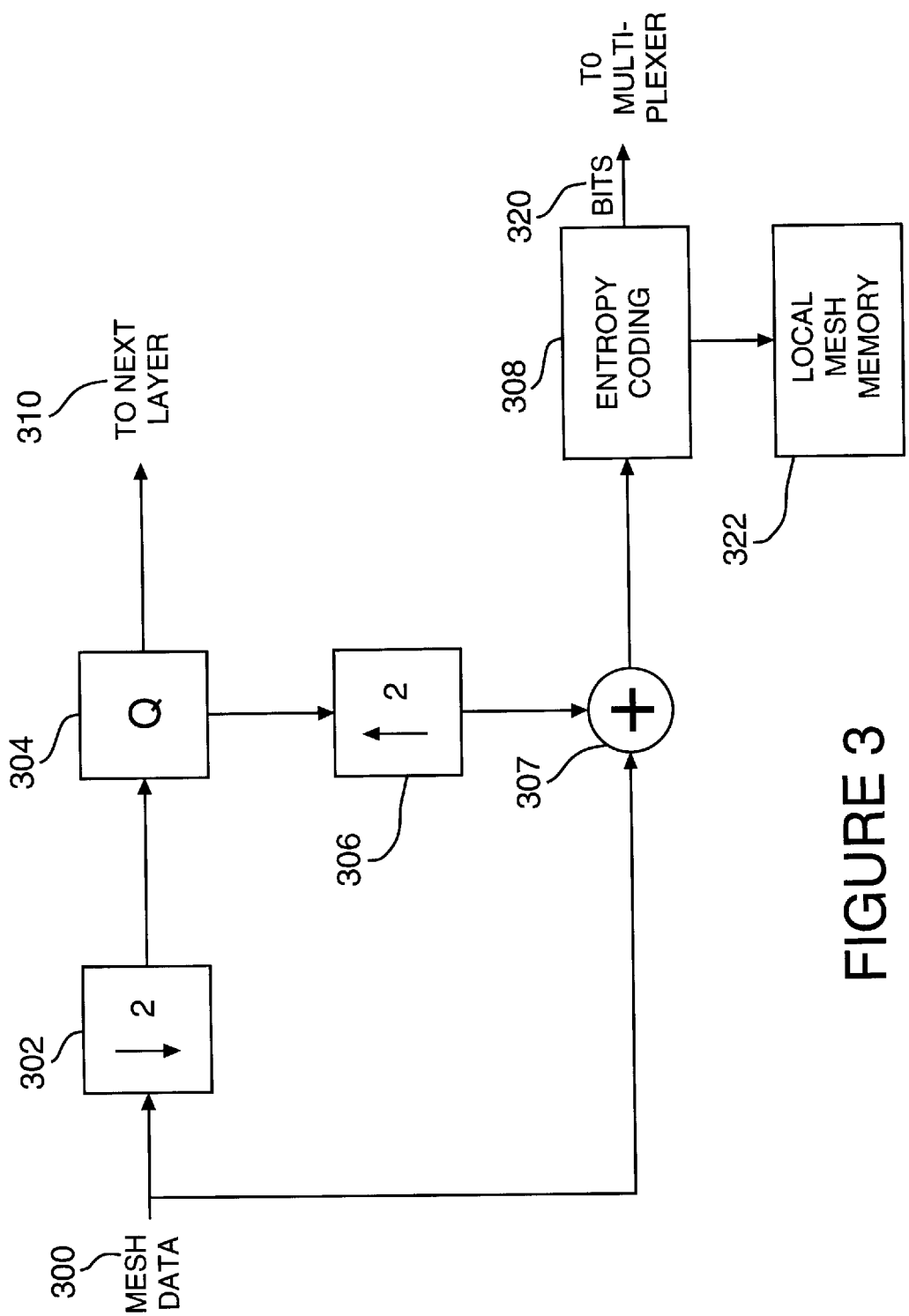
FIG. 3 is a block diagram showing a scalable coder using the pyramid progressive coding technique.

The detailed function of the mesh encoder 216 is depicted in the block diagram of FIG. 3. The encoder 216 takes the output signal from the mesh prediction unit 214 of FIG. 2 and 1) downsamples the mesh data by a factor of 2 with the downsampling operator 302, 2) quantizes the downsampled matrices with a quantizer 304, 3) forms the next pyramid layer of data 310 (lower spatial resolution) to be coded, 4) upsamples the current layer of compressed data with an upsampling operator 306 for residual error estimation, 5) estimates the residual error between the original data and the upsampled data at 307, 6) codes the residual error with an entropy coder 308, and 7) transmits the encoded bits to the multiplexer 218 of FIG. 2 and stores the bits in a local mesh memory 322. The principal advantage of this scheme is that the computations are simple, local, and may be performed in parallel. Moreover, the same computations are iterated to build the sequence of data constituting the pyramid. A perceptual lossless quantization is required for the boundary nodes of each region.

Referring again to FIG. 2, the multiplexer 218 multiplexes the bits from parameter encoder 206 and mesh encoder 216 for transmission to the decoder.

In one particular embodiment of interest, the temporal sequence of animation parameters is compressed by inserting a dimension reduction unit 203 between the parameter generator 200 and the prediction unit 204. The rest of the process in FIG. 2 remains the same for this particular embodiment. The dimensions refer to the number of animation parameters used at each time frame. The dimension reduction unit 203 performs 1) a transformation onto the subspace of the principal components and 2) dimension reduction (selection of significant components).

The viability of this invention has demonstrated by animating the quadrangular face model using facial animation parameters for facial expression and visual speech. The invention can handle various facial motions and achieve realistic-looking video images for facial expression and visual speech animation. The preferred embodiments of this invention have been illustrated and described above. Modifications and additional embodiments, however, will undoubtedly be apparent to those skilled in the art. Furthermore, equivalent elements may be substituted for those illustrated and described herein, parts or connections might be reversed or otherwise interchanged, and certain features of the invention may be utilized independently of other features. Consequently, the exemplary embodiments should be considered illustrative, rather than inclusive, while the appended claims are more indicative of the full scope of the invention.

The teaching of the following documents, which are referred to herein, is incorporated by reference:

H. Chen, et al., "Block Transform Coder for Arbitrarily Shaped Image Segment", U.S. Pat. No. 5,422,963

M. Deering, "Geometric Compression", ACM Computer Graphics Proceedings, Pages 13–20 (1995)

G. Taubin and J. Rossignac, "Geometric Compression through Topological Surgery", IBM Research Report RC-20340 (1996))

We claim:

1. A method of compressing data which represents an animation sequence of a three dimensional object at a series of discrete time frames, comprising the steps of:

identifying characteristic features of the object;

generating a quadrangular mesh representation of the object, whereby the object is mathematically defined by dividing it into one or more regions and hierarchically representing each region by a mesh, each mesh including three coordinate matrices which define the positions of nodes within the mesh;

selecting from the mesh representation of the features a set of animation parameters which are capable of specifying changes in the mesh corresponding to the animation of the object;

compressing each region mesh by applying pyramid progressive coding to the coordinate matrices for the mesh;

storing the initial values for the animation parameters at the beginning of the animation sequence; and at each time frame after the beginning of the animation sequence:

estimating the current values of the parameters, and compressing each parameter by:

estimating the change in the value of the parameter by subtracting its stored value for the previous time frame from its current value, quantizing the estimated difference, applying entropy coding to the quantized difference, and updating the stored value of the animation parameter with the decoded value.

2. The method of claim 1, wherein the step of generating a quadrangular mesh representation further comprises generating a mesh to specify the shape of the object and generating a sequence of meshes to specify the temporal deformation of the object at a series of discrete time frames.

3. The method of claim 1, wherein the step of generating a quadrangular mesh representation further comprises dividing the object into one or more regions according to surface curvature criteria or user specifications for the object.

4. The method of claim 1, wherein the step of compressing each region mesh further comprises coding the current matrices of the mesh representation into scalable layers of bit streams.

5. The method of claim 1, wherein the step of compressing each region mesh further comprises coding the residual of the matrices of the mesh representation into scalable layers of bit streams.

6. The method of claim 1, wherein the coordinate matrices in the step of generating a mesh representation further comprise Cartesian coordinate matrices.

7. The method of claim 1, wherein the coordinate matrices in the step of generating a mesh representation further comprise spherical coordinate matrices.

8. The method of claim 1, wherein the coordinate matrices in the step of generating a mesh representation further comprise cylindrical coordinate matrices.

9. The method of claim 1, wherein the step of storing the initial values for the animation parameters further comprises setting the initial values to zero.

10. The method of claim 1, wherein the step of quantizing the estimated difference further comprises uniformly quantizing the estimated difference.

11. The method of claim 1, wherein the step of quantizing the estimated difference further comprises perceptually quantizing the estimated difference.

12. The method of claim 1, wherein the step of compressing each parameter includes a transformation onto the subspace of the principal components.

13. The method of claim 1, wherein the step of compressing each parameter includes selection of significant components.

14. The method of claim 1, wherein the step of updating the stored value further comprises parameter decoding to decode the encoded value at the current time frame and updating the stored value with the current decoded value.

15. The method of claim 1, wherein the step of compressing each region mesh further comprises choosing a disable, inter, or intra mode of coding.

16. The method of claim 1, wherein the step of compressing each animation parameter further comprises choosing a disable, inter, or intra mode of coding.

* * * * *